(12) United States Patent
Sampath et al.

(10) Patent No.: US 9,104,452 B2
(45) Date of Patent: Aug. 11, 2015

(54) HYBRID REMOTE SESSIONS

(75) Inventors: Sriram Sampath, Redmond, WA (US);
Joy Chik, Redmond, WA (US); Costin Hagiu, Sammamish, WA (US); Huei Chung Wang, Kirkland, WA (US);
Mahesh Lotlikar, Sammamish, WA (US); Vladimir K. Stoyanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1157 days.

(21) Appl. No.: 12/510,105

(22) Filed: Jul. 27, 2009

(65) Prior Publication Data

US 2011/0018883 A1   Jan. 27, 2011

(51) Int. Cl.
*G06F 13/14* (2006.01)
*G06F 9/455* (2006.01)
*G06F 9/44* (2006.01)
*G06T 15/00* (2011.01)

(52) U.S. Cl.
CPC .......... *G06F 9/45533* (2013.01); *G06F 9/4445* (2013.01); *G06T 15/005* (2013.01); *G06T 2200/16* (2013.01)

(58) Field of Classification Search
CPC ..... G06F 13/102; G06F 3/038; G06F 9/4445; G06F 3/1454; G06F 9/45533; G06T 15/005; G06T 2200/16

USPC .................................. 345/520, 522, 537, 538
See application file for complete search history.

(56) References Cited

U.S. PATENT DOCUMENTS

| | | | |
|---|---|---|---|
| 7,349,956 B2 | 3/2008 | Anderson | |
| 7,412,625 B2 | 8/2008 | Shankar | |
| 7,453,465 B2 | 11/2008 | Schmieder | |
| 7,764,289 B2 * | 7/2010 | Stauffer et al. | 345/530 |
| 8,169,436 B2 * | 5/2012 | Rivera et al. | 345/419 |
| 2006/0039465 A1 | 2/2006 | Emerson | |
| 2006/0082583 A1 | 4/2006 | Leichtling | |
| 2007/0043550 A1 | 2/2007 | Tzruya et al. | |
| 2007/0061477 A1 | 3/2007 | Stoyanov | |
| 2007/0220168 A1 | 9/2007 | Parsons | |
| 2007/0244967 A1 | 10/2007 | Ben-Shachar | |
| 2008/0049616 A1 * | 2/2008 | Kamath et al. | 370/235 |

OTHER PUBLICATIONS

"Remote Desktop Protocol (RDP) Features and Performance," Windows® 2000 Terminal Services, http://www.thinclient.net/technology/RDP_Features_and_Performance.htm, 1-11.
Bigelow, S., "RDP Changes will Improve Virtual Desktop Performance," TechTarget, 2009, http://searchvirtualdesktop.techtarget.com/news/article/0,289142,sid194_gci1346439,00.html, 1-2.

* cited by examiner

*Primary Examiner* — Hau Nguyen
(74) *Attorney, Agent, or Firm* — Baker & Hostetler LLP (57) ABSTRACT

High Fidelity remoting can be enabled by loading a hybrid remote session in a computer system. The hybrid remote session can include components loaded in a console session and components loaded in a remote session.

20 Claims, 11 Drawing Sheets

HYBRID REMOTE SESSIONS

BACKGROUND

Remote services provide techniques for allowing a client to access to applications and data stored on a server. User input is send over a network to the server and audio and graphics are sent from the server to the client. Currently, when a remote user logs onto a server they are given a remote session (which has a certain set of components) and when a user logs onto a computer they are physically next to they are given a console session (which has another set of components). While these component sets have some overlap they have diverged over the years and a hybrid session that includes aspects of console and remote sessions would be beneficial.

One area that could benefit from a hybrid session would be the area of high fidelity remoting. High fidelity remoting techniques are being developed for a driver model used in a console session: a driver model that is different than the one used in remote sessions. Thus, a hybrid session including the driver model of a console session would be useful in order to generate remote sessions that can handle high fidelity remoting.

SUMMARY

An example embodiment of the present disclosure describes a method. In this example, the method includes, but is not limited to generating a hybrid remote session on an operating system, the hybrid remote session including a console session having a kernel, a graphics kernel, a user mode display driver, and a kernel mode display driver; storing graphics primitives generated by the user mode display driver; and sending the captured graphics primitives to a remote computer. In addition to the foregoing, other aspects are described in the claims, drawings, and text forming a part of the present disclosure.

An example embodiment of the present disclosure describes a method. In this example, the method includes, but is not limited to executing a guest operating system on a virtual machine, the operating system configured to effectuate a hybrid session; receiving, by the guest operating system, a request for a hybrid session from a remote computer system; generating, by the guest operating system, a hybrid session, the console session including a user mode display driver; capturing graphics primitives generated by the hybrid session; and sending the graphics primitives to the remote computer system. In addition to the foregoing, other aspects are described in the claims, drawings, and text forming a part of the present disclosure.

An example embodiment of the present disclosure describes a method. In this example, the method includes, but is not limited to receiving, by an operating system, a request for a hybrid session; and generating a hybrid session, the hybrid session including an operating system kernel, a graphics kernel, a user mode display driver, and a kernel mode display driver, wherein the operating system is configured to capture graphics information generated by the user mode display driver and send the captured graphics information to a remote computer. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
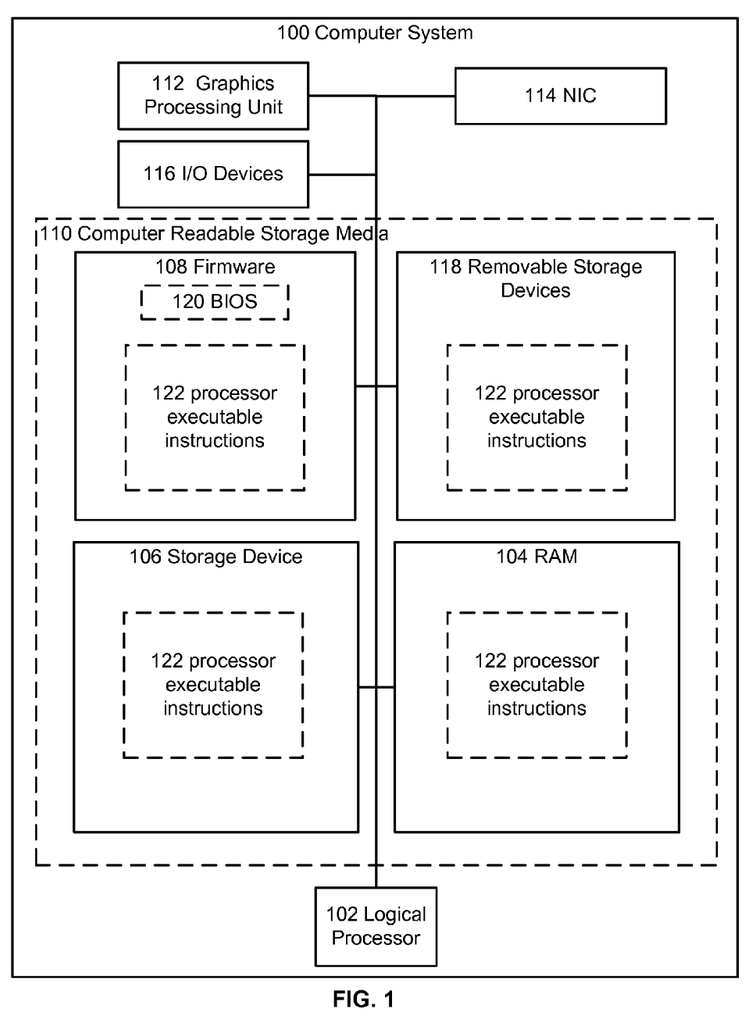
FIG. 1 depicts an example computer system wherein aspects of the present disclosure can be implemented.

Embodiments may execute on one or more computers. FIG. 1 and the following discussion are intended to provide a brief general description of a suitable computing environment in which the disclosure may be implemented. One skilled in the art can appreciate that computer systems 200, 300 can have some or all of the components described with respect to computer 100 of FIG. 1.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
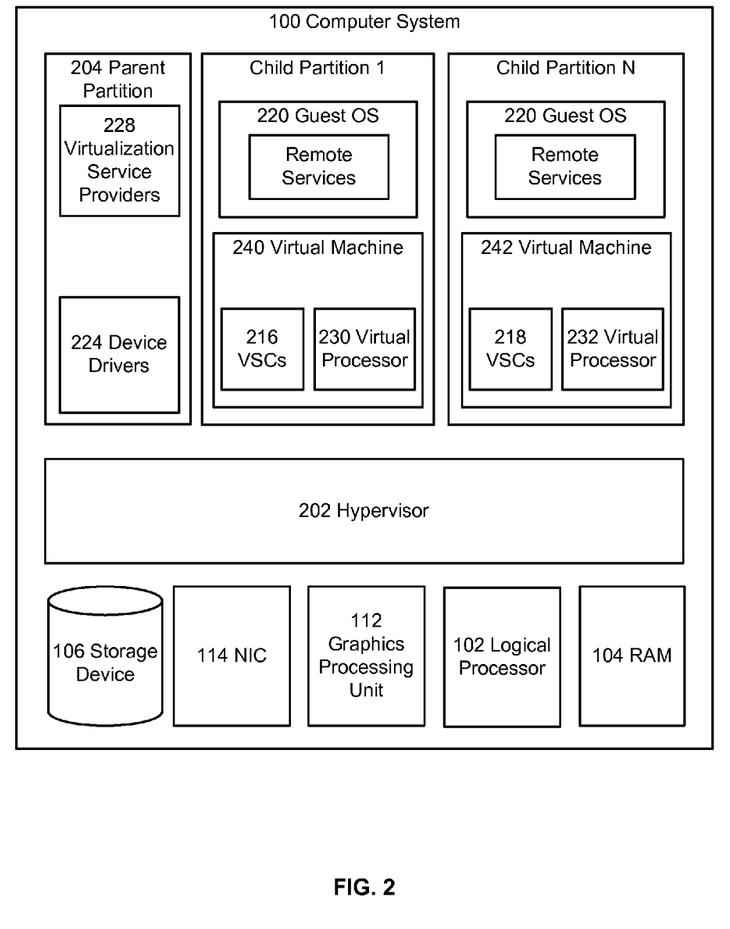
FIG. 2 depicts an operational environment for practicing aspects of the present disclosure.
Figure 3:
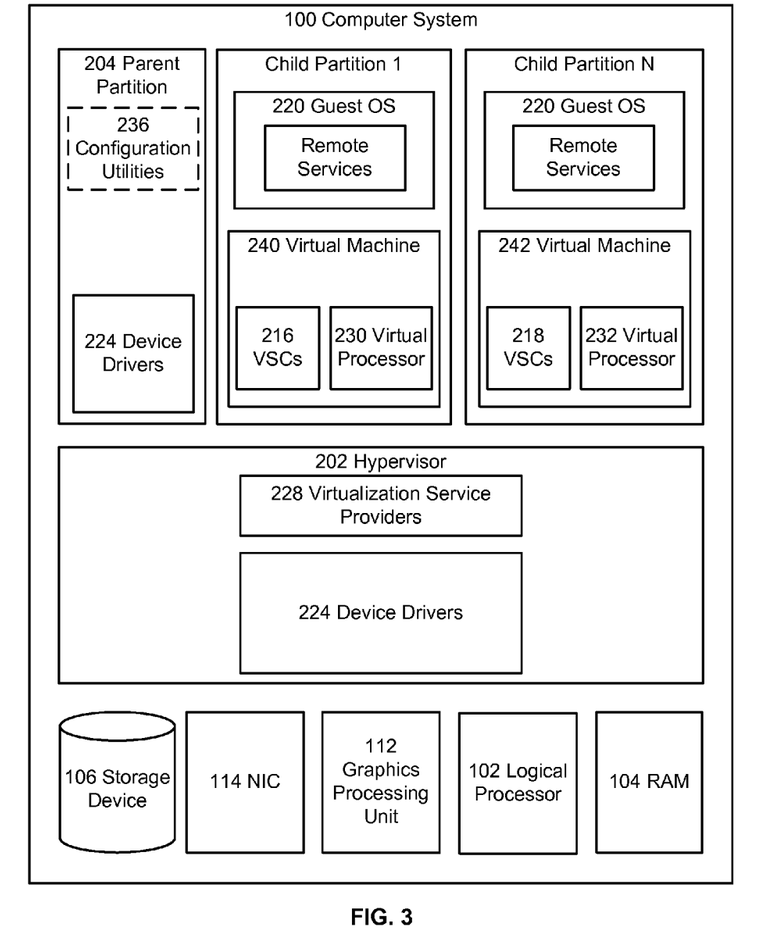
FIG. 3 depicts an operational environment for practicing aspects of the present disclosure.

Referring now to FIGS. 2 and 3, they depict high level block diagrams of computer systems configured to effectuate virtual machines. As shown by the figure, computer system 100 can include elements described in FIG. 1 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly, the hypervisor 202 can generate execution environments called partitions such as child partition 1 through child partition N (where N is an integer greater to or equal than 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the depicted example the computer system 100 includes a parent partition 204 that can be also thought of as domain 0 in the open source community. Parent partition 204 can be configured to provide resources to guest operating systems executing in the child partitions 1-N by using virtualization service providers 228 (VSPs) that are also known as back-end drivers in the open source community. In this example architecture the parent partition 204 can gate access to the underlying hardware. Broadly, the VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figure, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 3, it illustrates an alternative architecture that can be used. FIG. 3 depicts similar components to those of FIG. 2, however in this example embodiment the hypervisor 202 can include the virtualization service providers 228 and device drivers 224, and parent partition 204 may contain configuration utilities 236. In this architecture hypervisor 202 can perform the same or similar functions as the hypervisor 202 of FIG. 2. The hypervisor 202 of FIG. 3 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 4:
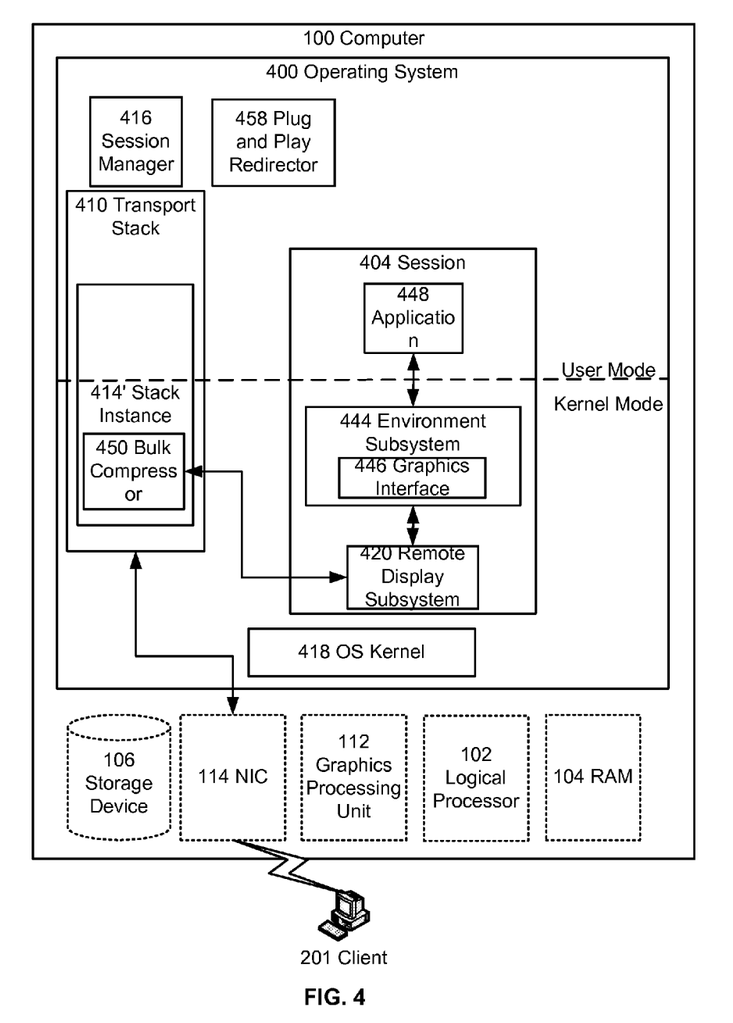
FIG. 4 illustrates a computer system including circuitry for effectuating remote desktop services.

Referring now to FIG. 4, it generally illustrates computer 100 including circuitry configured to provide remote desktop services to connecting clients. In an example embodiment the depicted operating system 400 execute directly on the hardware or it could be a guest operating system 220 or 222 that is effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol stack (RDP). The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

Figure 5:
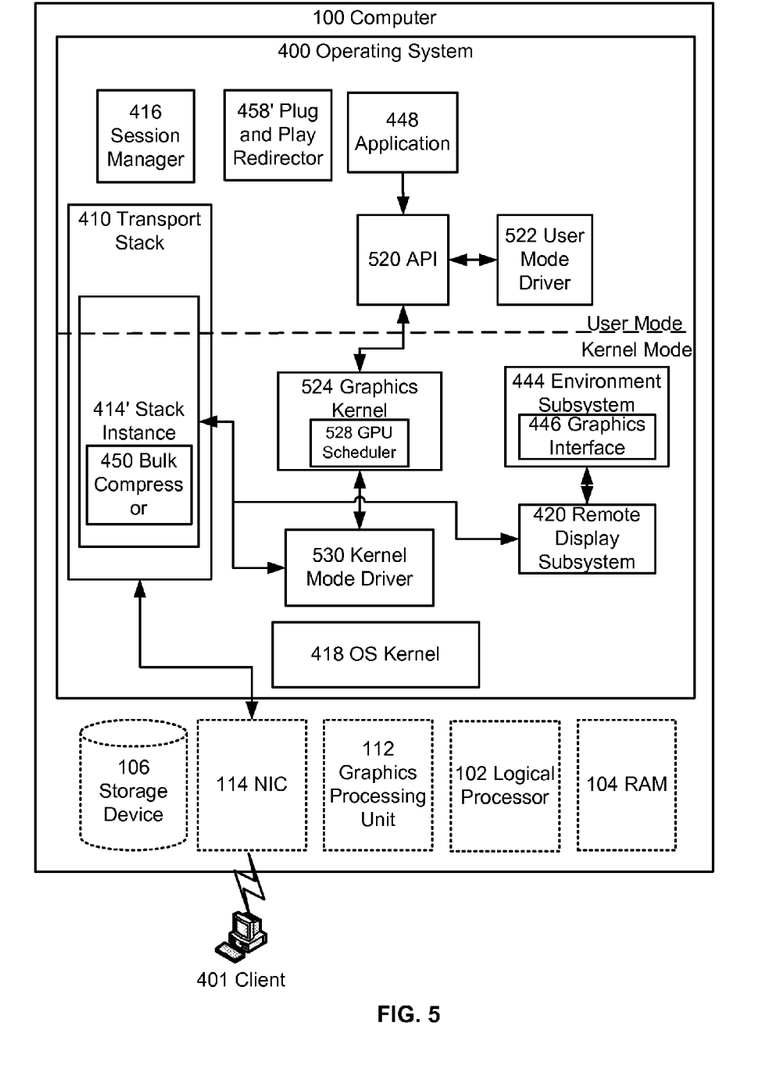
FIG. 5 illustrates a computer system including circuitry for effectuating high fidelity remote services.

Turning to FIG. 5, it depicts a computer system 100 including circuitry for effectuating high fidelity remote services. As shown by the figure, in an embodiment an computer system 100 can include components similar to those described in FIG. 1, FIG. 4, and can effectuate a hybrid remote session in lieu of or in addition to a remote session. In an embodiment of the present disclosure a hybrid remote session can include aspects of a console session, e.g., a session spawned for a user sitting at the computer system, and a remote session. Similar to that described above, the session manager 416 can initialize and manage the hybrid session by enabling/disabling components in order to effectuate a hybrid session that has components from both a console and remote session. In an example embodiment the session manager 416 can expose an API that allows the various components to enable/disable themselves based on what type of session is being generated. The session manager 416 can also be configured to expose a public API which can be used by third party vendors to extend the features of the hybrid session. For example, the API could allow various third party components to determine whether the session is a console, a remote, or a hybrid session and configure themselves accordingly.

Since the session is hybrid, various "console" components will be loaded along side with "remote session" components. One specific set of components that can be loaded in a hybrid session are the console components that enable high fidelity remoting, namely, the components that take advantage of 3D graphics and 2D graphics rendered by 3D hardware and other optimizations that are unavailable in a traditional remote session.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 6:
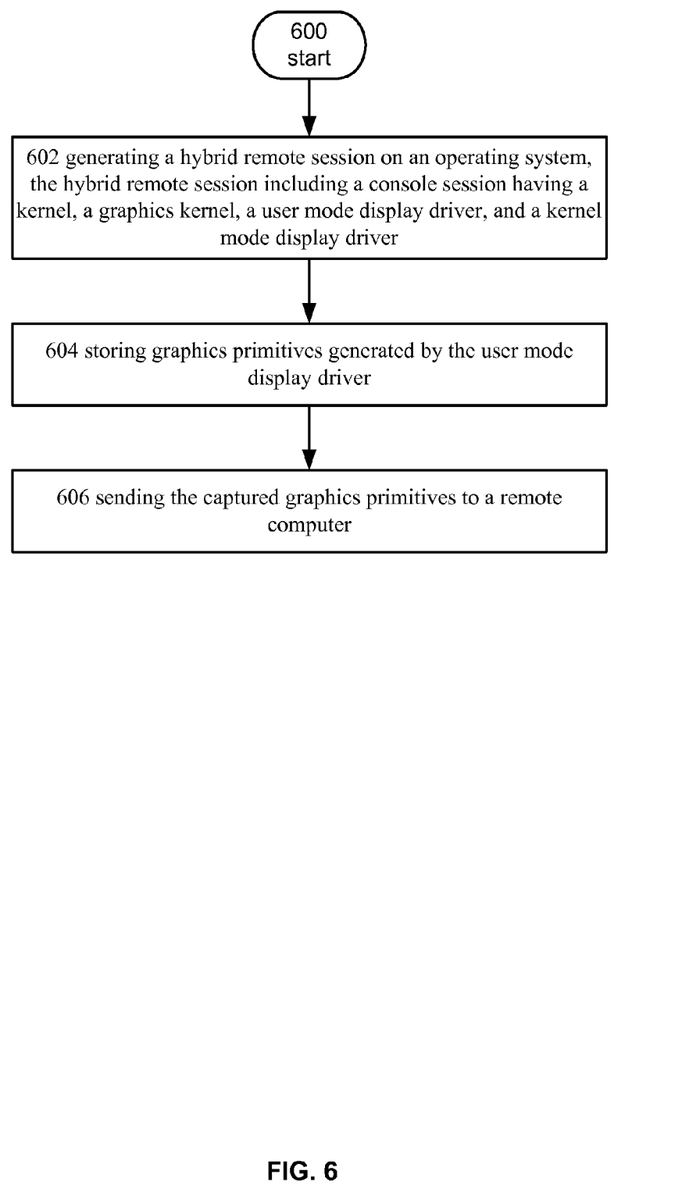
FIG. 6 depicts operational procedure for practicing aspects of the present disclosure.

Referring to FIG. 6, it illustrates an operational procedure for practicing aspects of the present disclosure including operations 600, 602, 604, and 606. Operation 600 begins the operational procedure and operation 602 shows generating a hybrid remote session on an operating system, the hybrid remote session including a console session having a kernel, a graphics kernel, a user mode display driver, and a kernel mode display driver. For example, and referring to FIG. 5, in an embodiment a hybrid remote session can be generated by a computer 100. For example, a session manager 416 can be executed by a logical processor 102 and a console session that includes certain remote components can be initialized. In this example the spawned session can include a kernel 418, a graphics kernel 524, a user mode display driver 522, and a kernel mode display driver 530.

Continuing with the description of FIG. 6, operation 604 shows storing graphics primitives generated by the user mode display driver. As shown by the figure, in an example the user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers.

Referring now to operation 606 it illustrates sending the captured graphics primitives to a remote computer. Continuing the example described above, the GPU scheduler 528 can run and determine to render the contents of the buffer. In this example the command to the graphics processing unit 112 of the server can be captured and the content of the buffer (primitives) can be sent to client 401 via network interface card 114.

Figure 7:
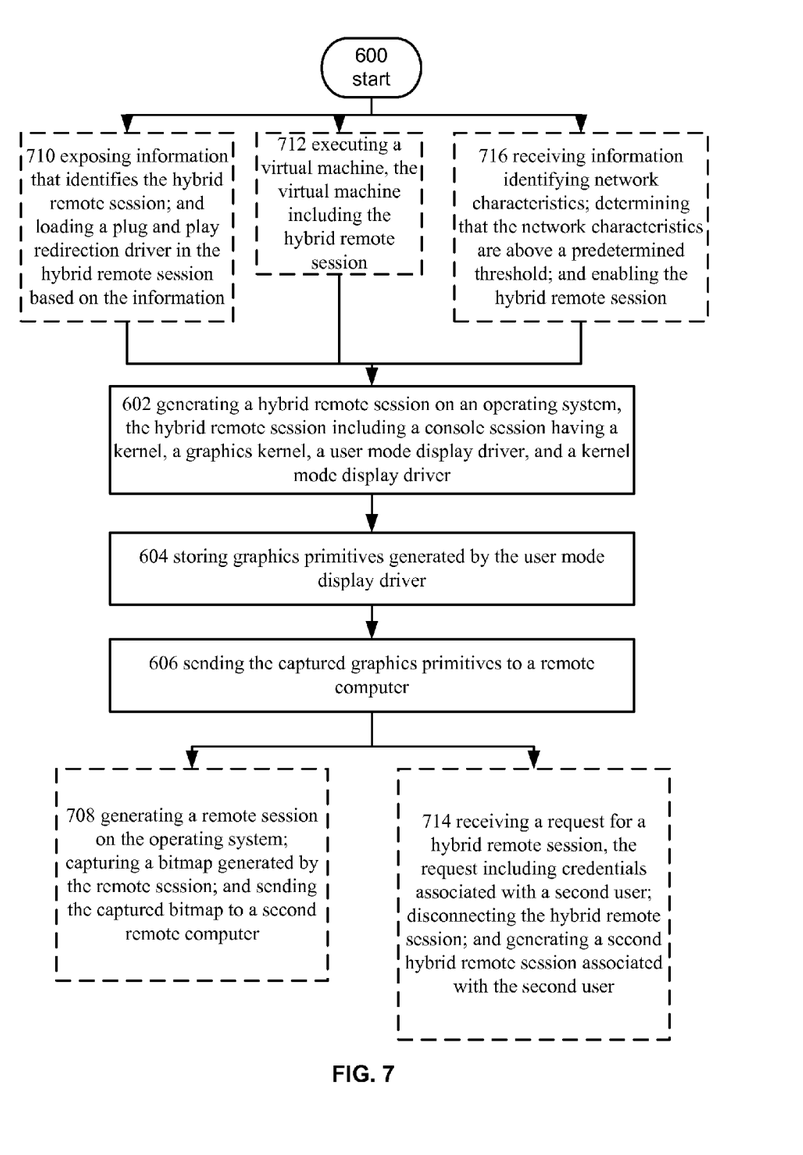
FIG. 7 depicts an alternative embodiment of the operational procedure of FIG. 6.

Turning now to FIG. 7, it illustrates an alternative embodiment of the operational procedure of FIG. 6 including operations 708 to 716. Operation 708 shows generating a remote session on the operating system; capturing a bitmap generated by the remote session; and sending the captured bitmap to a second remote computer. For example, in an embodiment a remote session can be effectuated by operating system 400 in addition to the hybrid remote session. That is, a session such as session 404 can be initialized and various subsystems can be loaded into the memory allocated for the session. In this example bitmaps can be rendered by the graphics interface 446 and captured by the remote display subsystem 420. The rendered bitmap can be sent to the stack instance 414 associated with session 404. The stack instance 414 can be executed and the bitmap can be sent to a remote computer system other than client 401.

Continuing with the description of FIG. 7, operation 710 shows exposing information that identifies the hybrid remote session; and loading a plug and play redirection driver in the hybrid remote session based on the information. For example, in an embodiment an API can be exposed by the session manager 416 that components can interface with in order to determine whether the session is hybrid in nature. In an example embodiment the component can be a plug and play redirecting component 458', e.g., a driver, can be loaded by the session manager 416 when the hybrid session starts. The component can be developed by a third party vendor and in this case the API can be a public API. The redirection component 458' can be configured to load drivers that can route data from devices such as mp3 players, printers, cut- and paste, or other peripheral devices from the client 401 to operating system 400. Thus, in an embodiment a user could plug an mp3 player into the client 401 and the operating system 400 can detect the mp3 player and interact with it over the network.

Continuing with the description of FIG. 7, operation 712 illustrates executing a virtual machine, the virtual machine including the hybrid remote session. For example, in an embodiment a virtual machine such as virtual machine 240 of FIG. 2 or 3 can be instantiated and the virtual machine can serve as a platform for execution for the operating system 400. Guest operating system 220 can embody operating system 400 in this example. A virtual machine could be instantiated when a connection request is received over the network. For example, the parent partition 204 could in an embodiment include an instance of the transport stack 410 and could be configured to receive connection requests. The parent partition 204 could initialize a virtual machine in response to a connection request along with a guest operating system including the capabilities to effectuate hybrid remote sessions. The connection request can then be passed to the transport stack 410 of the guest operating system 220. In this example each hybrid session could be instantiated on an operating system that is executed by its own virtual machine.

Continuing with the description of FIG. 7, operation 714 shows receiving a request for a hybrid remote session, the request including credentials associated with a second user; disconnecting the hybrid remote session; and generating a second hybrid remote session associated with the second user. For example, in an embodiment of the present disclosure operating system 400 can receive a connection request for a hybrid remote session from, for example, another client while client 401 while client 401 is connected. In this example the session for client 401 and a session for the other client can be started. Typically when a client connects for a remote session a session is initialized and it includes a remote display subsystem 420. The remote display subsystem 420 allows for a logon screen to be rendered for the new client. In an embodiment a client side process can execute that renders a screen that can collect credentials and send the credentials to operating system 400. The credentials can be validated and client 401 can be disconnected from the drivers which can then be reallocated to service the connecting client.

Continuing with the description of FIG. 7, operation 716 shows receiving information identifying network characteristics; determining that the network characteristics are above a predetermined threshold; and enabling the hybrid remote session. For example, in an embodiment hybrid remote sessions can be enabled when the network connection is sufficient to support hybrid remoting and disabled when network conditions are insufficient. For example, in one embodiment when the client connects the transport stack 410 can identify properties of the connection. The transport stack 410 can trace the route packets took between the computer 100 and the client 401 and determine the quality of service for the connection. The transport stack 410 can determine the quality of the connection and compare it to a predetermined threshold that identifies, for example, a minimum threshold needed to support high fidelity remoting. If the current quality is greater than the minimum threshold hybrid remote sessions can be enabled.

Figure 8:
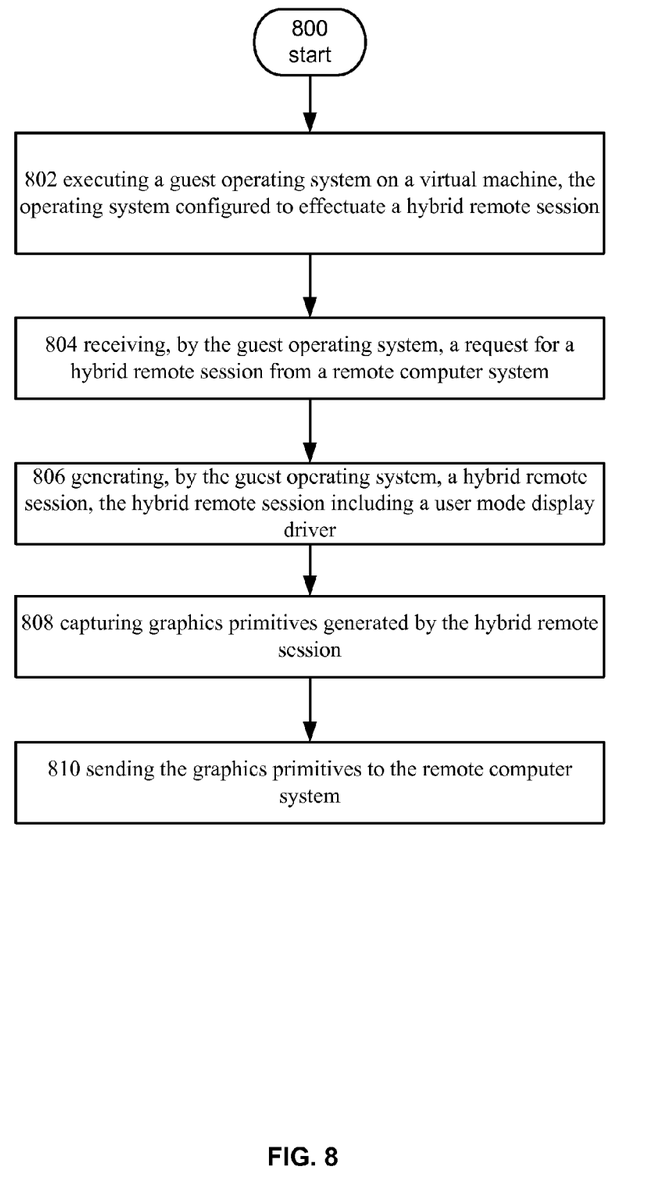
FIG. 8 depicts operational procedure for practicing aspects of the present disclosure.

Turning now to FIG. 8, it illustrates an operational procedure for practicing aspects of the present disclosure including operations 800-810. Operation 800 begins the operational procedure and operation 802 shows executing a guest operating system on a virtual machine, the operating system configured to effectuate a hybrid session. For example, in an embodiment a virtual machine can be instantiated and a guest operating system 220 embodying operating system 400 can be executed. Similar to that described above, a virtual machine could be instantiated when a connection request is received over the network.

Continuing with the description of FIG. 8, operation 804 shows receiving, by the guest operating system, a request for a hybrid session from a remote computer system. For example, a request for a hybrid remote session can be received from a client 401. The request can include a request for a session that supports high fidelity remoting. The request can be handled by the transport stack 410 and passed to the session manager 416.

Continuing with the description of FIG. 8, operation 806 shows generating, by the guest operating system, a hybrid session, the console session including a user mode display driver. For example, and referring to FIG. 5, in an embodiment a hybrid remote session can be generated by an operating system. The session manager 416 can be configured to determine that the request is for a session that supports high fidelity remoting and the session manager 416 can load a console session. In addition to loading the console session the session manager 416 can load a stack instance 414' for the session and configure system to capture primitives generated by a user mode display driver 522.

Turning now to operation 808, it illustrates capturing graphics primitives generated by the hybrid session. In an example the user mode driver 522 can generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

Operation 810 shows sending the graphics primitives to the remote computer system. Continuing the example described above, the GPU scheduler 528 can run and determine to issue an instruction to render the content of the buffer. In this example the graphics primitives associated with the instruction to render can be sent to client 401 via network interface card 114.

Figure 9:
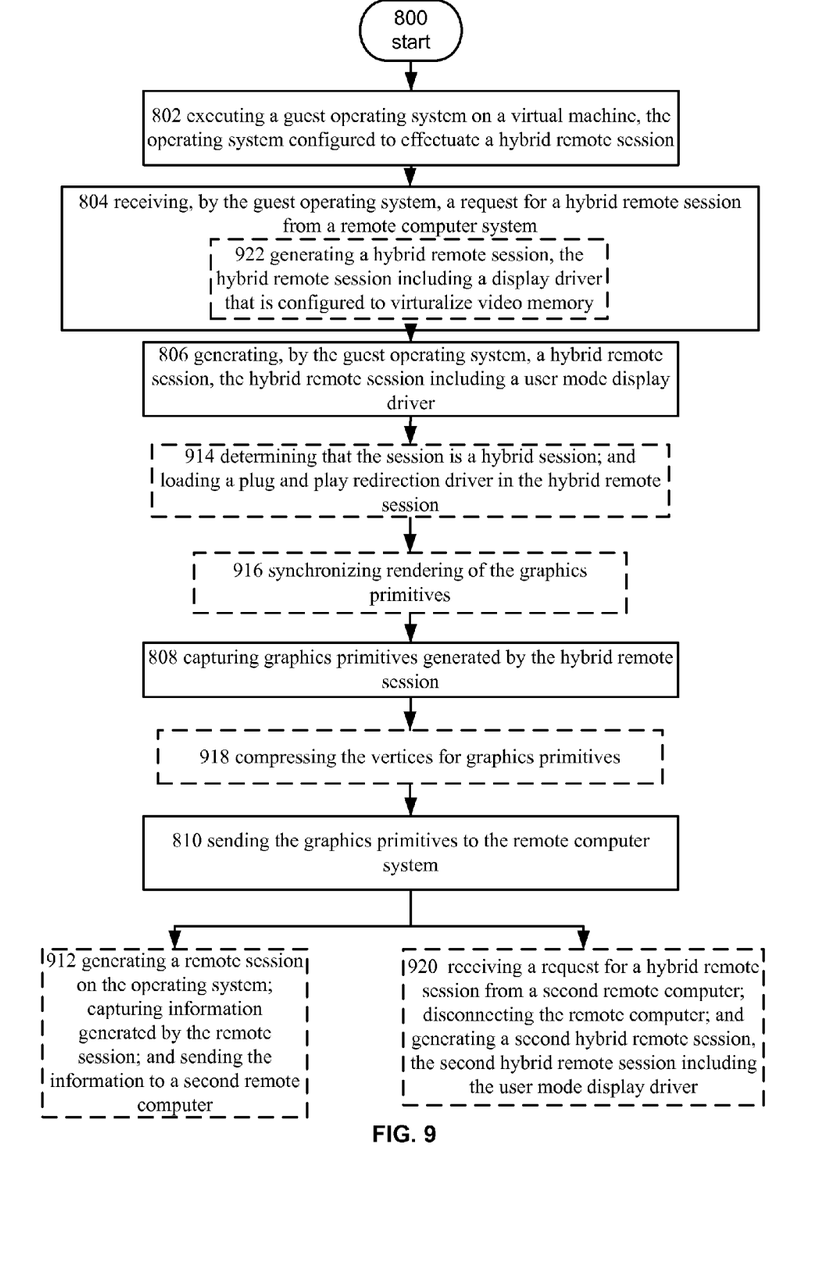
FIG. 9 depicts an alternative embodiment of the operational procedure of FIG. 8.

Turning now to FIG. 9, it illustrates an alternative embodiment of the operational procedure of FIG. 8 including operations 912-922. Operation 912 shows generating a remote session on the operating system; capturing information generated by the remote session; and sending the information to a second remote computer. For example, in an embodiment a remote session can be effectuated by operating system 400 in addition to the hybrid remote session. In this example a session space can be defined and various subsystems can be loaded into the session such as an environment subsystem 444. Information such as bitmaps, audio, copy-and-paste data, etc., can be captured and sent to the other remote computer system.

Continuing with the description of FIG. 9, operation 914 shows determining that the session is a hybrid session; and loading a plug and play redirection driver in the hybrid remote session. For example, a plug and play redirecting component 458' can be configured to determine whether a newly spawned session is a hybrid session or another type of session. In an embodiment the session manager 416 can include information that identifies the type of session being initialized and the plug and play redirecting component 458' and can load a redirection driver to enable a feature such as, cut- and paste, hard drive mounting, printing redirection, etc.

Continuing with the description of FIG. 9, operation 916 shows synchronizing rendering of the graphics primitives. For example, at least one kernel mode process can be executed by at least one logical processor 112 and the at least one logical processor 112 can synchronize rendering vertices stored in different buffers. In a specific example a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

For example, one or more threads of a process such as a videogame may map multiple buffers and each thread could issue a draw command. Identification information for the vertices, e.g., information generated per buffer, per vertex, or per batch of vertices in a buffer, can be sent to the GPU scheduler 528. The information can be stored in a table along with identification information associated with vertices from the same, or other processes and used to synchronize rendering of the various buffers.

In a specific example, a word processing program could execute and declare two buffers, for example, one for storing vertices for generating 3D menus and the other one storing commands for generating letters that will populate the menus. The application can map the buffer and; issue draw commands. The GPU scheduler 528 can determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

Continuing with the description of FIG. 9 operation 918 shows compressing the vertices for graphics primitives. For example, a bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

Operation 920 of FIG. 9 shows receiving a request for a hybrid session from a second remote computer; disconnecting the remote computer; and generating a second hybrid session, the second hybrid session including the user mode display driver. For example, in an embodiment of the present disclosure operating system 400 can receive a connection request for a hybrid remote session from, for example, another client while client 401 while client 401 is connected. Client 401 can be disconnected from the drivers which can then be reallocated to service the connecting client.

Operation 922 of FIG. 9 shows generating a hybrid remote session, the hybrid remote session including a display driver that is configured to virturalize video memory. For example, in an embodiment the graphics processing unit 112 can be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

Figure 10:
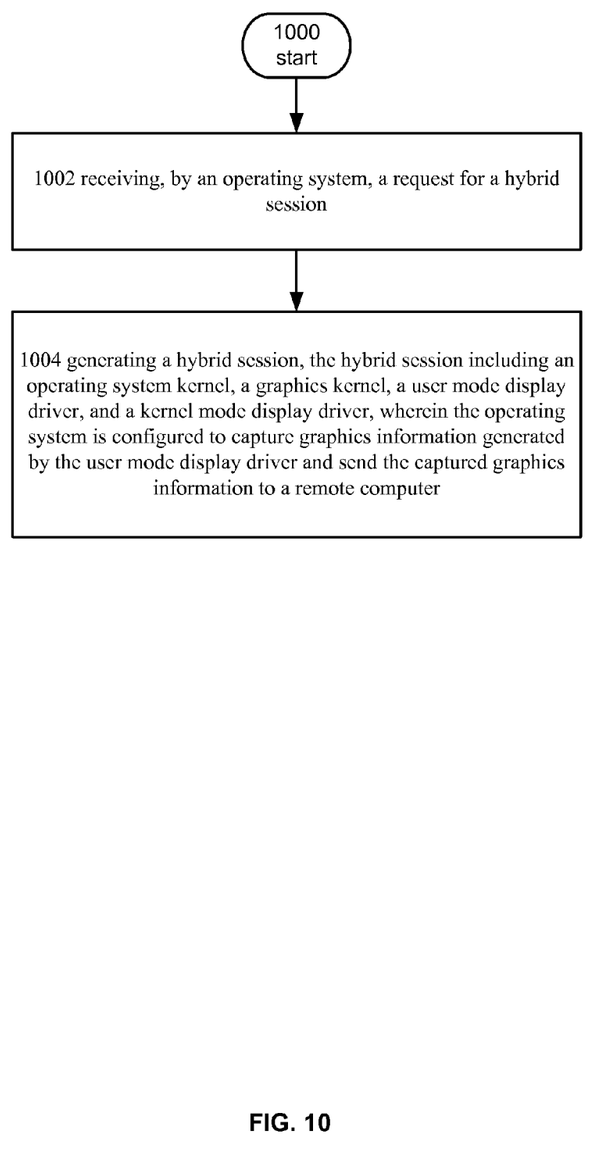
FIG. 10 depicts operational procedure for practicing aspects of the present disclosure.

Turning now to FIG. 10, it illustrates an operational procedure for practicing aspects of the present disclosure including operations 1000, 1002, 1004. Operation 1000 begins the operational procedure and operation 1002 shows receiving, by an operating system, a request for a hybrid session. For example, a request for a hybrid remote session can be received from a client 401. The request can include a request for a session that supports high fidelity remoting for example.

Continuing with the description of FIG. 10, operation 1004 shows generating a hybrid session, the hybrid session including an operating system kernel, a graphics kernel, a user mode display driver, and a kernel mode display driver, wherein the operating system is configured to capture graphics information generated by the user mode display driver and send the captured graphics information to a remote computer. In an example an operating system 400 can be configured, e.g., various subsystems and drivers can be loaded to capture primitives and send them to a remote computer such as client 401. Similar to that described above, a session manager 416 can be executed by a logical processor 102 and a console session that includes certain remote components can be initialized. In this example the spawned session can include a kernel 418, a graphics kernel 524, a user mode display driver 522, and a kernel mode display driver 530.

Figure 11:
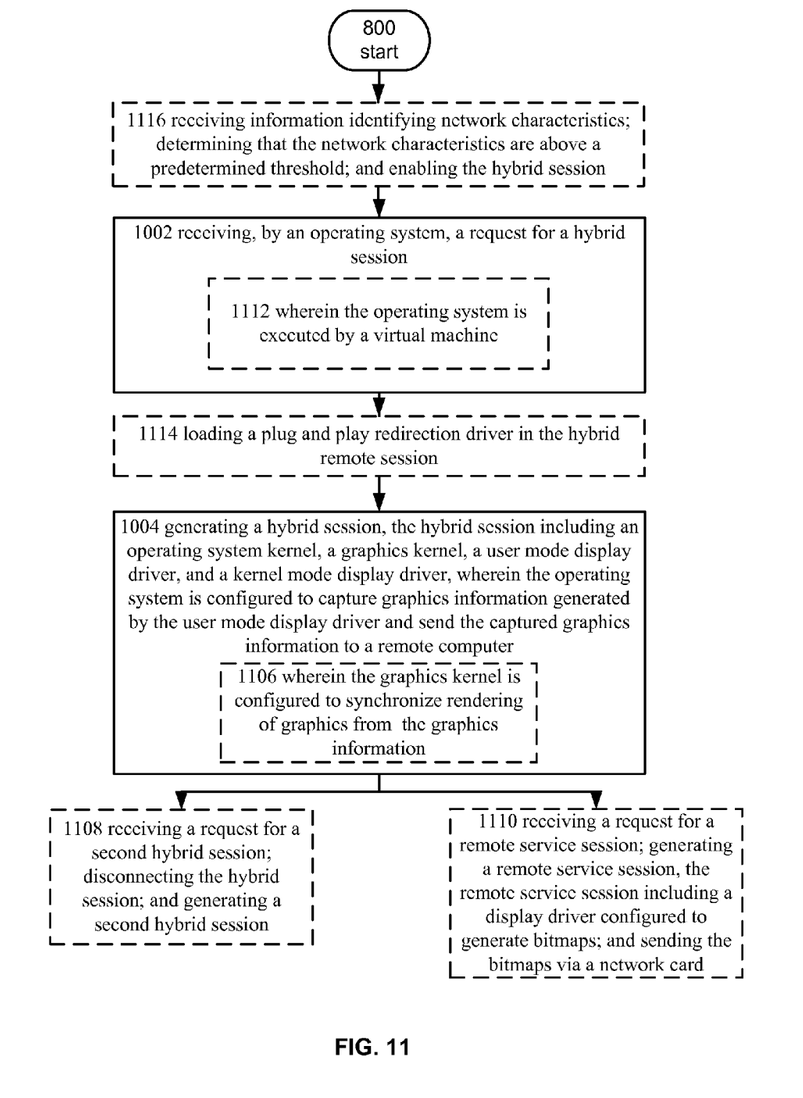
FIG. 11 depicts an alternative embodiment of the operational procedure of FIG. 10.

Turning now to FIG. 11, it shows an alternative embodiment of the operational procedure of FIG. 10 including operations 1106-1116. Operation 1106 shows that in an embodiment the graphics kernel is configured to synchronize rendering of graphics from the graphics information. For example, a graphics kernel can schedule GPU operations. The GPU scheduler 528 can merge separate buffers of vertices into the correct execution order such that the graphics processing unit of the client 401 executes the commands in an order that allows them to be rendered correctly.

Continuing with the description of FIG. 11, operation 1108 shows receiving a request for a second hybrid session; disconnecting the hybrid session; and generating a second hybrid session. For example, in an embodiment of the present disclosure operating system 400 can receive a connection request for a hybrid remote session from, for example, another client while client 401 while client 401 is connected. In this example the session for client 401 and a session for the other client can be started. In this example a client side process can execute that renders a screen that can collect credentials and send the credentials to operating system 400. The credentials can be validated and client 401 can be disconnected from the drivers which can then be reallocated to service the connecting client.

Operation 1110 shows receiving a request for a remote session; generating a remote session, the remote session including a display driver configured to generate bitmaps; and sending the bitmaps via a network card. For example, in an embodiment a remote session can be effectuated by operating system 400 in addition to the hybrid remote session. That is, a session such as session 404 can be initialized and various subsystems can be loaded into the memory allocated for the session. In this example bitmaps can be rendered by the graphics interface 446 and captured by the remote display subsystem 420. The rendered bitmap can be sent to the stack instance 414 associated with session 404 via a network card 114.

Operation 1112 shows that in an embodiment the operating system is executed by a virtual machine. For example, in an embodiment a virtual machine can be instantiated and the a guest operating system 220 embodying operating system 400 can be executed. Similar to that described above, a virtual machine could be instantiated when a connection request is received over the network.

Operation 1114 shows loading a plug and play redirection driver in the hybrid remote session. For example, a plug and play redirecting component 458', e.g., a driver, can be loaded by the session manager 416 when the hybrid session starts. The redirection component 458' can be configured to load drivers that can route data from devices such as mp3 players, printers, cut- and paste, or other peripheral devices from the client 401 to operating system 400. Thus, in an embodiment a user could plug an mp3 player into the client 401 and the operating system 400 can detect the mp3 player and interact with it over the network.

Operation 1116 shows receiving information identifying network characteristics; determining that the network characteristics are above a predetermined threshold; and enabling the hybrid session. For example, in an embodiment hybrid remote sessions can be enabled when the network connection is sufficient to support hybrid remoting and disabled when network conditions are insufficient. For example, in one embodiment when the client connects the transport stack 410 can identify properties of the connection. The transport stack 410 can trace the route packets took between the computer 100 and the client 401 and determine the quality of service for the connection. The transport stack 410 can determine the quality of the connection and compare it to a predetermined threshold that identifies, for example, a minimum threshold needed to support high fidelity remoting. If the current quality is greater than the minimum threshold hybrid remote sessions can be enabled.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer readable storage medium including processor executable instructions, the computer readable storage medium comprising:
   instructions for generating a hybrid remote session on an operating system of a server computing device, the hybrid remote session including a remote session and a console session having a kernel in order to provide console session components to the hybrid remote session, a graphics kernel, a user mode display driver, and a kernel mode display driver, wherein the hybrid remote session facilitates communication between a client computing device and the server computing device;
   instructions for storing graphics primitives generated by the user mode display driver; and
   instructions for sending the stored graphics primitives to a remote computer.

2. The computer readable storage medium of claim 1, further comprising:
   instructions for generating a remote session on the operating system;
   instructions for capturing a bitmap generated by the remote session; and
   instructions for sending the captured bitmap to a second remote computer.

3. The computer readable storage medium of claim 1, further comprising:
   instructions for exposing information that identifies the hybrid remote session; and
   instructions for loading a plug and play redirection driver in the hybrid remote session based on the information.

4. The computer readable storage medium of claim 1, further comprising:
   instructions for executing a virtual machine, the virtual machine including the hybrid remote session.

5. The computer readable storage medium of claim 1, further comprising:
   instructions for receiving a request for a hybrid remote session, the request including credentials associated with a second user;
   instructions for disconnecting the hybrid remote session; and
   instructions for generating a second hybrid remote session associated with the second user.

6. The computer readable storage medium of claim 1, further comprising:
   instructions for receiving information identifying network characteristics;
   instructions for determining that the network characteristics are above a predetermined threshold; and
   instructions for enabling the hybrid remote session.

7. A computer system, comprising:
   circuitry for executing a guest operating system on a virtual machine, the operating system configured to effectuate a hybrid session;
   circuitry for receiving, by the guest operating system, a request for a hybrid session from a remote computer system;
   circuitry for generating, by the guest operating system, a hybrid session including a console session and a remote session, the console session including a user mode display driver;
   circuitry for capturing graphics primitives generated by the hybrid session; and
   circuitry for sending the graphics primitives to the remote computer system.

8. The computer system of claim 7, further comprising:
   circuitry for generating a remote session on the operating system;
   circuitry for capturing information generated by the remote session; and
   circuitry for sending the information to a second remote computer.

9. The computer system of claim 7, further comprising:
   circuitry for determining that the session is a hybrid session; and
   circuitry for loading a plug and play redirection driver in the hybrid session.

10. The computer system of claim 7, further comprising:
    circuitry for synchronizing rendering of the graphics primitives.

11. The computer system of claim 7, further comprising:
    circuitry for compressing the vertices for graphics primitives.

12. The computer system of claim 7, further comprising:
    circuitry for receiving a request for a hybrid session from a second remote computer;
    circuitry for disconnecting the remote computer; and
    circuitry for generating a second hybrid session, the second hybrid session including the user mode display driver.

13. The computer system of claim 7 wherein the hybrid session includes a display driver that is configured to virtualize video memory.

14. A method, comprising:
    receiving, by an operating system, a request for a hybrid session; and generating a hybrid session, the hybrid session including a remote session and a console session having an operating system kernel, a graphics kernel, a user mode display driver, and a kernel mode display driver, wherein the operating system is configured to capture graphics information generated by the user mode display driver and send the captured graphics information to a remote computer.

15. The method of claim 14, wherein the graphics kernel is configured to synchronize rendering of graphics from the graphics information.

16. The method of claim 14, further comprising:
receiving a request for a second hybrid session;
disconnecting the hybrid session; and
generating a second hybrid session.

17. The method of claim 16, further comprising:
receiving a request for a remote session;
generating a remote session, the remote session including a display driver configured to generate bitmaps; and
sending the bitmaps via a network card.

18. The method of claim 16, wherein the operating system is executed by a virtual machine.

19. The method of claim 16, further comprising:
loading a plug and play redirection driver in the hybrid session.

20. The method of claim 16, further comprising:
receiving information identifying network characteristics;
determining that the network characteristics are above a predetermined threshold; and
enabling the hybrid session.

* * * * *